(12) United States Patent
Leskinen

(10) Patent No.: US 11,851,360 B2
(45) Date of Patent: Dec. 26, 2023

(54) METHOD AND DEVICE FOR CONTROLLING A THERMAL TREATMENT PROCESS FOR GLASS SHEETS

(71) Applicant: Glaston Finland Oy, Tampere (FI)

(72) Inventor: Miikael Leskinen, Tampere (FI)

(73) Assignee: GLASTON FINLAND OY, Tampere (FI)

( * ) Notice: Subject to any disclaimer, the term of this patent is extended or adjusted under 35 U.S.C. 154(b) by 192 days.

(21) Appl. No.: 17/077,127

(22) Filed: Oct. 22, 2020

(65) Prior Publication Data

US 2021/0114917 A1    Apr. 22, 2021

(30) Foreign Application Priority Data

Oct. 22, 2019   (FI) ...................................... 20195901

(51) Int. Cl.
*C03B 9/36*    (2006.01)
*C03B 9/38*    (2006.01)
(Continued)

(52) U.S. Cl.
CPC ........ *C03B 27/012* (2013.01); *C03B 27/0417* (2013.01); *C03B 35/16* (2013.01);
(Continued)

(58) Field of Classification Search
CPC ... C03B 27/04; C03B 27/012; C03B 27/0417; C03B 27/044; C03B 25/00; C03B 25/08; G01B 11/046; G01B 11/22; G05D 23/00
See application file for complete search history.

(56) References Cited

U.S. PATENT DOCUMENTS 3,779,731 A * 12/1973 Pollock ..................... C03B 5/24
                                                              700/157
6,064,040 A *  5/2000 Muller .................. C03B 27/012
                                                              219/400
(Continued)

FOREIGN PATENT DOCUMENTS

CN       102942300 A      2/2013
CN       108467190 A *    8/2018   ............. C03B 25/00
(Continued)

OTHER PUBLICATIONS

Finnish Search Report dated Apr. 27, 2020, issued by the Finnish Patent and Registration Office in the corresponding Finnish Patent Application No. 20195901. (2 pages).
(Continued)

*Primary Examiner* — Galen H Hauth
*Assistant Examiner* — Steven S Lee
(74) *Attorney, Agent, or Firm* — Boone IP Law, PLLC

(57) ABSTRACT

The disclosure relates to a method for controlling a glass sheet heating furnace using information describing a glass load including a plurality of glass sheets. The method includes transporting the glass sheets toward a heating furnace, before thermal treatment, photographing the glass load by a camera to obtain a camera image, sending first information of the camera image to a computer, on the basis of which the computer determines a first value of a dimension of the glass load and selects a value of at least one adjustment parameter of the heating furnace on the basis of the first value before the glass load has been transferred into the heating furnace, and reading second information by a line scanner, which is sent to the computer, on the basis of which the computer determines a second value of the dimension of the glass load.

15 Claims, 3 Drawing Sheets

(51) Int. Cl.
  *C03B 17/04* (2006.01)
  *C03B 27/012* (2006.01)
  *C03B 35/16* (2006.01)
  *C03B 27/04* (2006.01)
  *C03B 27/044* (2006.01)
  *G01B 11/04* (2006.01)
  *G01N 21/86* (2006.01)
  *G05D 23/00* (2006.01)

(52) U.S. Cl.
  CPC .......... *C03B 27/044* (2013.01); *G01B 11/046* (2013.01); *G01N 21/86* (2013.01); *G05D 23/00* (2013.01)

(56) References Cited

U.S. PATENT DOCUMENTS

| | | | | |
|---|---|---|---|---|
| 8,322,162 | B2* | 12/2012 | Janhunen | C03B 29/08 |
| | | | | 219/400 |
| 8,327,667 | B2* | 12/2012 | Balduin | C03B 35/145 |
| | | | | 65/106 |
| 2002/0134109 | A1* | 9/2002 | Vitkala | C03B 29/08 |
| | | | | 65/273 |
| 2003/0061834 | A1* | 4/2003 | Vitkala | C03B 27/0417 |
| | | | | 65/273 |
| 2006/0107694 | A1* | 5/2006 | Janhunen | C03B 29/08 |
| | | | | 65/29.11 |
| 2006/0108346 | A1* | 5/2006 | Janhunen | C03B 27/0417 |
| | | | | 219/388 |
| 2013/0094714 | A1* | 4/2013 | Ohto | G06V 20/64 |
| | | | | 65/29.14 |
| 2013/0098109 | A1* | 4/2013 | Ohto | G01N 21/84 |
| | | | | 65/29.14 |
| 2015/0082834 | A1* | 3/2015 | Vehmas | C03B 35/181 |
| | | | | 65/351 |
| 2015/0344346 | A1* | 12/2015 | Jiao | C03B 25/08 |
| | | | | 65/29.11 |
| 2016/0297704 | A1* | 10/2016 | Ohto | G01B 11/25 |
| 2019/0152832 | A1* | 5/2019 | Xu | C03B 27/012 |

FOREIGN PATENT DOCUMENTS

| | | | | |
|---|---|---|---|---|
| EP | 0937687 | A2 | | 8/1999 |
| EP | 1 659 100 | A1 | | 5/2006 |
| FI | 115626 | B | | 6/2005 |
| GB | 2094290 | B | * 5/1954 | .......... C03B 27/0404 |
| GB | 2094290 | A | * 9/1982 | .......... C03B 27/0404 |
| JP | 05116967 | A | * 5/1993 | ....... C03B 37/01413 |
| WO | 9744286 | A1 | | 11/1997 |
| WO | WO-9744286 | A1 | * 11/1997 | ............. C03B 27/00 |
| WO | WO-2004106852 | A1 | * 12/2004 | .......... C03B 23/0252 |
| WO | WO-2018220328 | A1 | * 12/2018 | ........... C03B 23/023 |
| WO | WO-2019029179 | A1 | * 2/2019 | ............. C03B 25/00 |

OTHER PUBLICATIONS

Herrod R.A., et al., Glass Annealing Process Simulation Using Expert Systems: A Glass Industry Application of Artificial Intelligence, IEEE Transactions on Industry Applications, vol. 24, No. 1, pp. 43-48, Jan.-Feb. 1988.

Pedra et al., "Camera Calibration Using Detection and Neural Networks," IFAC Proceedings Volumes, (May 1, 2013), pp. 245-250, Retrieved from the Internet: URL:http://citenpl.internal.epo.org/wf/web/citenpl/citenpl.html.

The extended European Search Report dated Mar. 22, 2021, by the European Patent Office in corresponding European Patent Application No. 20199521.4-1105. (7 pages).

* cited by examiner

METHOD AND DEVICE FOR CONTROLLING A THERMAL TREATMENT PROCESS FOR GLASS SHEETS

CROSS-REFERENCE TO RELATED APPLICATION

The present application claims priority to Finnish Patent Application No. 20195901 filed on Oct. 22, 2019, the entire content of which is incorporated herein by reference in its entirety for all purposes.

FIELD

The present disclosure relates to a method and device for controlling a thermal treatment process for glass sheets using information describing a load of glass sheets. The glass sheets are transported through a heating furnace, and before thermal treatment, information describing the load of glass sheets is read by a camera. This information can be used for defining the dimensions of the glass load, and further, for selecting the adjustment parameters of the heating furnace. One embodiment of the disclosure is a tempering process for glass sheets and, occurring in connection with it, the control of the heating of a tempering furnace.

BACKGROUND

Information describing the load of glass sheets is needed, inter alia, to improve the tempering process. Between loads of glass sheets, there may be even great differences, for example, between the sizes, shapes and locations of the glasses, so to achieve the best final result, it is essential to optimize the tempering process according to the sizes, shapes and locations of the glass sheets.

From patent publication FI100526 is known a method and device which is adapted for controlling a tempering process. Herein, the shape and loading information of a glass load is read by optical sensors located at the end of the loading table, the optical sensors being adapted one for each resistor string of the furnace, and under which the load moves as it transfers into the furnace. The information produced by the optical sensor is Boolean in type, it tells whether there has been glass in the measurement beam of the sensor at various moments.

Patent publication FI115626B describes a method and a device, in which is used a streak camera, over which the load moves as it transfers into the furnace. Using the streak camera, it is possible to read information relating to the load of glass sheets, such as the shape, size and location of the glass sheets.

The dimensional precision to be achieved using a row of optical, capacitive or other sensors depends on the distance between the sensors in a row. The disadvantage of a sensor row is, i.a., that it is not able to detect the distance between two sensors if the adjacent edges of the glasses are at the measurement beams of two adjacent sensors. There are also disadvantages relating to the detection of holes and curving shapes in a glass. Another disadvantage of the sensor row is that the information regarding the loading pattern of a glass load is obtained only at that time when the entire glass load has passed through the measurement line of the sensor row. This delay problem relates also to a streak camera like that of patent publication FI115626B that is also affected by camera technology problems.

In using a camera, it has, in practice, proven to be a disadvantage that the dimensions of a load of glass cannot be reliably defined using only the information of a photograph. Glass, as a transparent material, is difficult to detect from a photograph, for which reason a computer-determined dimension of a glass load, for example, a loading pattern, is generally partially incorrect. Increasing the number of cameras and improving lighting conditions is helpful but does not obviate the disadvantage of being prone to faults. Expenses also increase along with the number of cameras. A machine vision solution based on just a photograph from a camera is also prone to occasional momentary reflections and movements in the imaging beam of the camera, the adverse effects of which cannot be prevented with just cameras or by developing the imaging conditions in practice, i.e., in glass tempering factories.

SUMMARY

To reduce the disadvantages of prior art, one object of the disclosure is a method and a device which determines the loading pattern already when the glass load is on the loading table, which information is used for automatic control of the heating furnace before the glass load has transferred into the heating furnace, and which is able to learn to be more precise and to fix its mistakes immediately once the glass load has transferred into the furnace. Illustrative methods and devices of the disclosure determine a loading pattern reliably, with good dimensional precision, do not require additional space and are inexpensive in price.

One object of the disclosure is a method for controlling a glass sheet heating furnace using information describing the load of glass sheets, in which method glass sheets are transported through a heating furnace, and before thermal treatment, the glass load is photographed by at least one camera, the information of the camera image is sent to a computer, on the basis of which information the computer defines the value of at least one dimension of the glass load, selects the value of at least one adjustment parameter of the heating furnace on the basis of this dimension before the glass load has transferred into the heating furnace, in which method the information required for defining the dimensions of the glass load is also read by a line scanner, which information is sent to a computer, on the basis of which the computer determines the value of at least one dimension of the glass load. One object of the disclosure is also a device for controlling a glass sheet heating furnace using information describing a load of glass sheets, the device comprising a computer, devices for adjusting the convection blowing and/or the current to be supplied to the electric resistors of the furnace, at least one 2D camera which is aligned to photograph a glass load on the transfer conveyor upstream of the heating furnace, and at least one line scanner, the measurement line of which covers the entire width of the glass loading area, and through which the glass load passes in the thermal treatment process.

The disadvantages of prior art are obviated by a method according to the disclosure such that information is read from a glass load on the loading table by at least one camera taking two-dimensional images, after which the verifying information is read from the moving glass load by a different device. For the purpose of controlling the heating, it is useful to know information that describes the load as thoroughly as possible, specifically the loading degree and the locations, shapes and sizes of the glass sheets, already before the glass load transfers into the heating furnace.

For the present disclosure, it is preferable that already as the glass load transfers into the furnace, it passes over or under a device producing, transverse to its direction of travel, one-dimensional location information relating to the glass sheets, wherein the movement allows two-dimensional location information to be obtained. The measurement line of the device covers the entire width of the glass loading area. In the present disclosure, this device may be a row of separate sensors, a curtain of optical or other radiation, a streak camera, or some other type of device producing, transverse to the direction of travel of the glass, one-dimensional location information. Generally, such a device may be called a line scanner. According to one preferred embodiment of the disclosure, the line scanner is a row of capacitive sensors, because these have been found to be the most reliable means. The operation of a capacitive sensor is based on a magnetic field in its detection area. The sensor reacts to changes in dielectricity occurring in the area of its magnetic field, i.e., changes in the electric field of the sensor caused by the glass. The disadvantage of separate optical sensors (for example, a row of photoelectric cells) is the transparency of the glass to light. Thus, a sensor reacting to a change in radiation reaching the sensor is preferably sensitive to other changes than those of normal visible light. According to one preferred embodiment, the line scanner has an adequately densely distributed (distribution less than 50 mm) row of separate sensors, as the dimensional precision to be achieved by the row is dependent on the distance between the sensors in the row. As sensor density increases, precision improves.

The disclosure relates to a method for defining the dimensions of a glass load to be thermally treated, in which method the glass sheets are transported through a heating furnace, and before thermal treatment, the glass load is photographed by at least one 2D camera, which information the computer uses for defining the dimensions of the glass load, after which the information needed for defining the dimensions of the glass load is read by a line scanner, which information the computer uses for defining the dimensions of the glass load. In the method, the determined dimensions of the glass load are used for selecting the adjustment parameters of the heating furnace, i.e., the heating furnace is controlled using the information describing the load of glass sheets.

The disclosure relates to a device for controlling a glass sheet heating furnace using information describing the load of glass sheets, the device comprising a computer, devices for adjusting the convection blowing of the furnace and/or the current to be supplied to the electric resistors of the furnace, at least one 2D camera which is aligned to photograph a glass load on the transfer conveyor upstream of the heating furnace, and at least one line scanner, the measurement line of which covers the entire width of the glass loading area, and through which the glass load passes in the thermal treatment process.

In the following, by camera is meant a 2D camera, i.e., a device taking two-dimensional images, unless otherwise specified.

One primary disadvantage of a line scanner in the vicinity of the mouth of a furnace is that the information regarding the loading pattern of a glass load is obtained only at that time when the entire glass load has passed over or under the line scanner. In this case, the front end of the glass load has already had time to be heated for the delay time t1. At the typical transfer speed w=0.4 m/s, with load length LG=6 m and the distance of the line scanner S=0.2 m from the furnace, the delay time t1=(6−0.2)/0.4=14.5 s. For example, for a glass of thickness 3 mm, the typical heating time in the furnace is 120 s. Thus, a significant portion (14.5/120=12%) of the heating time, and even at the most critical moments of the heating, cannot be brought into an automatic adjustment circuit depending on a loading pattern or at least some of its dimensions, using only a line scanner in front of the furnace. Indeed, by increasing the distance S of the line scanner from the furnace, the delay time t1 can be decreased even down to zero but this increases the price of the transfer conveyor and the floor surface area it requires in the glass processing factory. In one solution of the disclosure, the line scanner is at a distance less than the length of a load from the heating furnace. Preferably, the line scanner is in front of the furnace at a distance of less than 3 m from the furnace. In the disclosure, the adjustment value of the furnace, based on the information of the camera image, is set into effect in the heating recipe such that the delay time t1 decreases. Typically, it is set into effect in the heating recipe before the heating of the front end of the glass load begins.

The beginning of heating is one of the most critical moments in the heating, wherein the glass sheets easily bend into convex or concave shape in relation to the support plane of the roller track, if the heating intensities of the upper and lower surfaces of the glass sheet differ. This bending directs the entire weight of the glass sheet onto the rollers via a small area of the surface of the glass, at which site of the glass forms quality faults, such as white haze. The heating intensities of the upper and lower surfaces are adjusted to be adequately similar by adjusting the convection blowing pressures, the temperatures or the electrical current supply to the resistors of the furnace.

Illustrative embodiments of the present disclosure can solve the above said primary disadvantage, i.e., by bringing the automatic control of the furnace depending on the loading pattern into effect without the delay time t1.

BRIEF DESCRIPTION OF THE FIGURES

In the following, the disclosure is described in more detail by reference to the accompanying drawings, in which.

DETAILED DESCRIPTION OF THE ILLUSTRATIVE EMBODIMENTS

Figure 1:
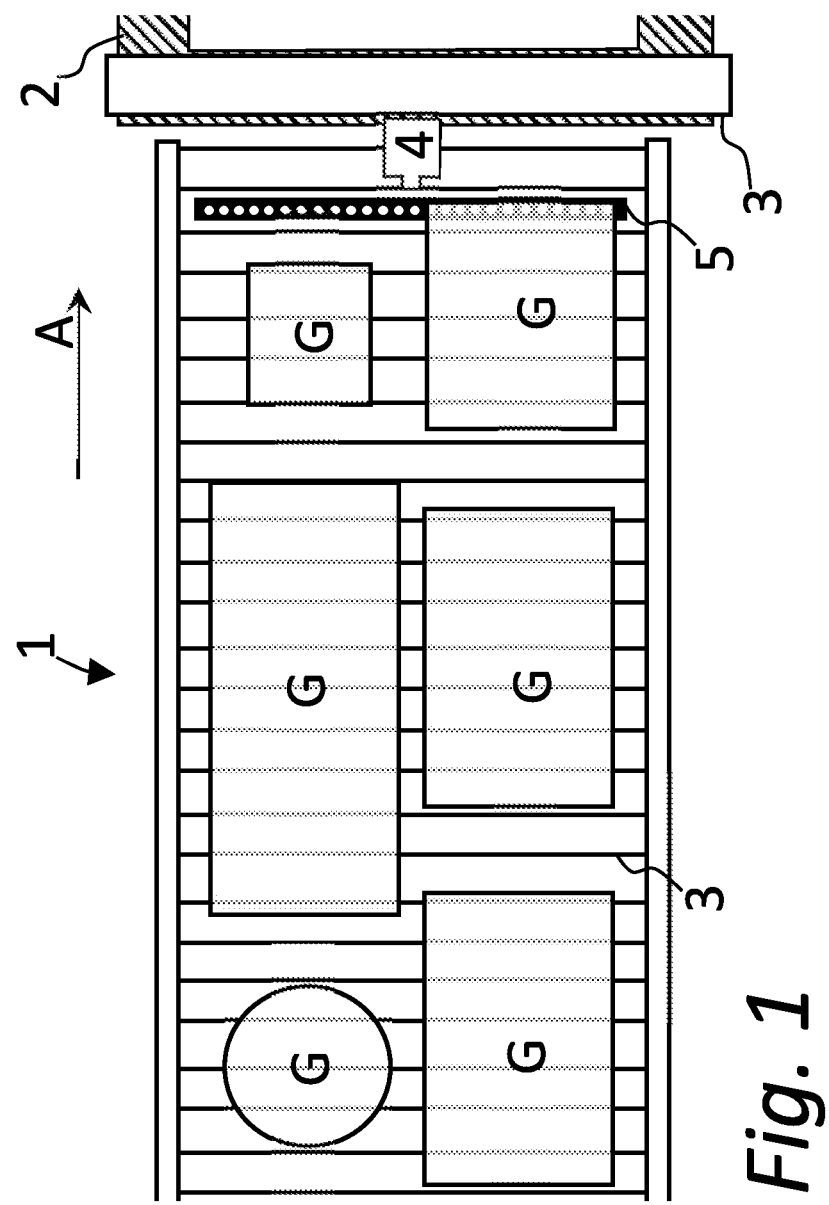
FIG. 1 shows a glass load entering the furnace as viewed from above in one illustrative embodiment of the disclosure.
Figure 2:
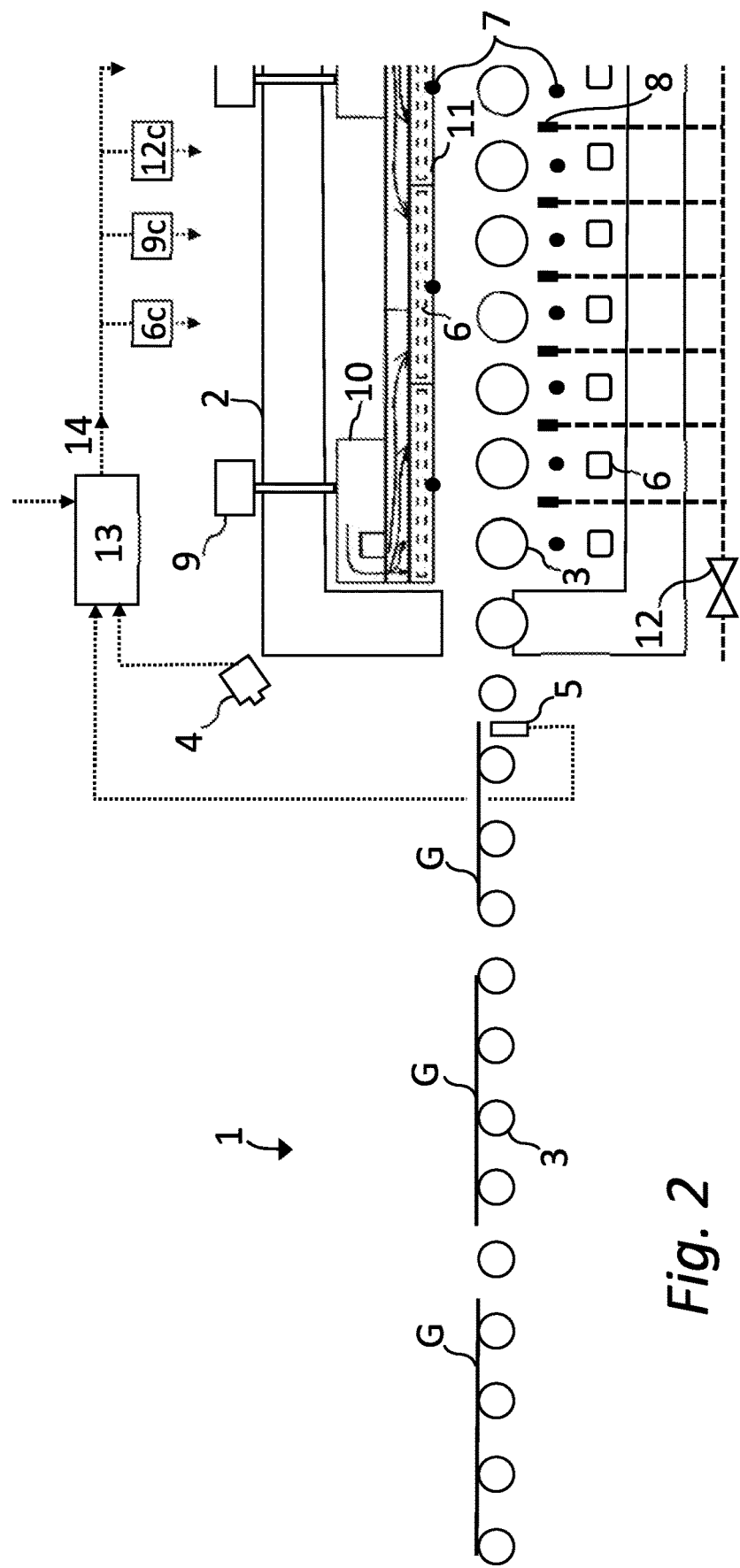
FIG. 2 shows a device for controlling the thermal treatment process according to one illustrative embodiment of the disclosure.

FIG. 1 shows a glass load entering the furnace as viewed from above in one embodiment of the disclosure. Arrow A is the direction of travel of the glass sheet on the loading table 1 towards the furnace 2. The glass sheets G are loaded onto the rollers 3 of the loading table into the desired pattern. The loading table 1 may also be called the transfer conveyor, because a glass sheet is transferred into the furnace along the roller track of the loading table. Strictly speaking, after the actual loading table area upstream of the furnace, the transfer conveyor typically has several rollers. The camera 4 takes a photograph of the glass load before it transfers into the furnace. Preferably, at least one camera 4 is located 1-4 m above the glass load. In FIGS. 1 and 2, the camera is located substantially on the midline of the width of the furnace, and it photographs the load as viewed from the direction of its front end. The camera may also be located at the side, directly above or at the rear end of the transfer conveyor. The glass load passes along the rollers of the roller track 3 into the furnace 2, over or under the line scanner 5, depending on the line scanner technology used and its location.

In a furnace 2 according to one preferred embodiment of the disclosure, for heating the glass load are used electric resistors 6 and convection blowing means that are located above and below the roller track 3 of the furnace. In the furnace of FIG. 2, the upper convection blowing means are of so-called circulating air convection type and the lower ones of compressed air convection type. In the upper convection of the furnace 2, the blower 10, the impeller of which is rotated by the motor 9, draws air from inside the furnace, and guides it via the air channels into the blower housings which are equipped with electric resistors 6. The air heated by the electric resistors discharges from blowing apertures 11 in the lower surface of the nozzle housings as jets towards the upper surface of the glass sheets. The electric resistors also heat the surfaces of the nozzle housings which radiate heat onto the glass sheets to be heated. The wattage to be supplied to the electric resistors 6 is adjusted based on the temperatures measured by the temperature sensors 7. On the lower surface of the glass, the electric resistors 6, the rollers 3, and the other surfaces of the furnace radiate heat onto the glass. Further, onto the lower surface of the glass are blown air jets by blower nozzles 8, the blowing air of which is compressed by an air compressor outside of the furnace. In the furnace 2, above the glass are several nozzle housings with their separately adjustable resistors, in both the longitudinal and transverse directions of the furnace. The number of separately adjustable resistors in the adjustment matrix is 10-30 in the transverse direction of the furnace, and 6-30 in the longitudinal direction of the furnace.

Correspondingly, below the glass are several separately adjustable resistors, in both the longitudinal and transverse directions of the furnace, and, in the transverse direction of the furnace, several blower nozzle lines in the longitudinal direction of the furnace that are separately adjustable by several adjustment valves 12.

FIG. 2 shows a device according to the disclosure for controlling a thermal treatment process. Planar glass sheets G to be tempered, which have a shape and size, are placed manually or by a loading robot onto the conveyor formed by the rollers 3 of the loading table 1. A notification that glass loading has completed is sent to the control system, i.e., to the computer 13, wherein the glass load moves forward on the loading table, until it stops as the line scanner 5 detects that its front end has arrived at the line scanner 5, such as in the moment of FIG. 2. The glass load can be stopped for photographing also at some other desired site, or it can be photographed while in motion. The camera 4 takes an image of the preferably stationary glass load on the loading table, which information is sent to the computer 13. The computer determines the dimension of the loading pattern of the glass load based on this information, and selects at least one adjustment parameter of the heating furnace, i.e., a part of the heating recipe of the heating furnace, on the basis of the dimension of the loading pattern. This heating recipe information selected by the computer is preferably the rotational speed the of the motor 9 of the convection blower 10 of the furnace, upon which the blowing pressure of the jets discharging from the blowing apertures 11 towards the upper surface of the glass is dependent, or the adjustment pressure of the adjustment valve 12, upon which the blowing pressure of the jets discharging from the blower nozzles 8 towards the upper surface of the glass is dependent. Each of the pipe branches downstream of the adjustment valve 12, the pipe branches each leading to a blower nozzle 8, may also be equipped with shut-off valves. In this case, the heating recipe information selected by the computer on the basis of loading information can be the open/closed position of the shut-off valve that is dependent on time. Thus, blowing can be allowed, i.e., the shut-off valve opened, only when the glasses transferring into the furnace are above the blower nozzle 8. Omitting the blowing of such a glass-free area saves compressed air. The heating recipe information selected by the computer on the basis of the loading information is preferably also the local adjustment temperature of the furnace that is measured by a temperature sensor 7, and that is managed by the supply of electric current to the electric resistors 6. The control system sets this heating recipe information into effect as the setting values for the furnace, once the glass load that was earlier already in the furnace exits from the furnace, for example, for quench cooling. Thus, a value for an adjustment parameter selected on the basis of a dimension of the loading pattern is in effect when the new glass load on the loading table begins to transfer into the furnace. The glass load to be transferred into the furnace passes over the line scanner 5, the individual sensors of which send information to the computer. The information is Boolean in type, i.e., it tells whether glass has been above the sensor at various moments. The computer forms a loading pattern from the information of the separate sensor. The line scanner is at distance from the heating furnace that is up to 10 m, or less than the greatest possible load length of the heating furnace, in order that the total length of the transfer conveyor would not grow to be too great. A total length that is too great becomes unreasonably expensive and requires too much space, and thus is not an inexpensive solution overall. Preferably, the sensor row is up to 3 m distance from the heating furnace.

A method and a device according to the disclosure may be combined in many various types of furnace. According to various embodiments, for heating the furnace can be used resistors, convection blowing or compressed air, or various combinations thereof.

According to one preferred embodiment, the length of the transfer conveyor of a heating furnace controlled by a device according to the disclosure, i.e., the distance from the beginning of the loading table to the beginning of the furnace, is up to 50% longer than the maximum length of a glass load in the furnace.

Figure 3:
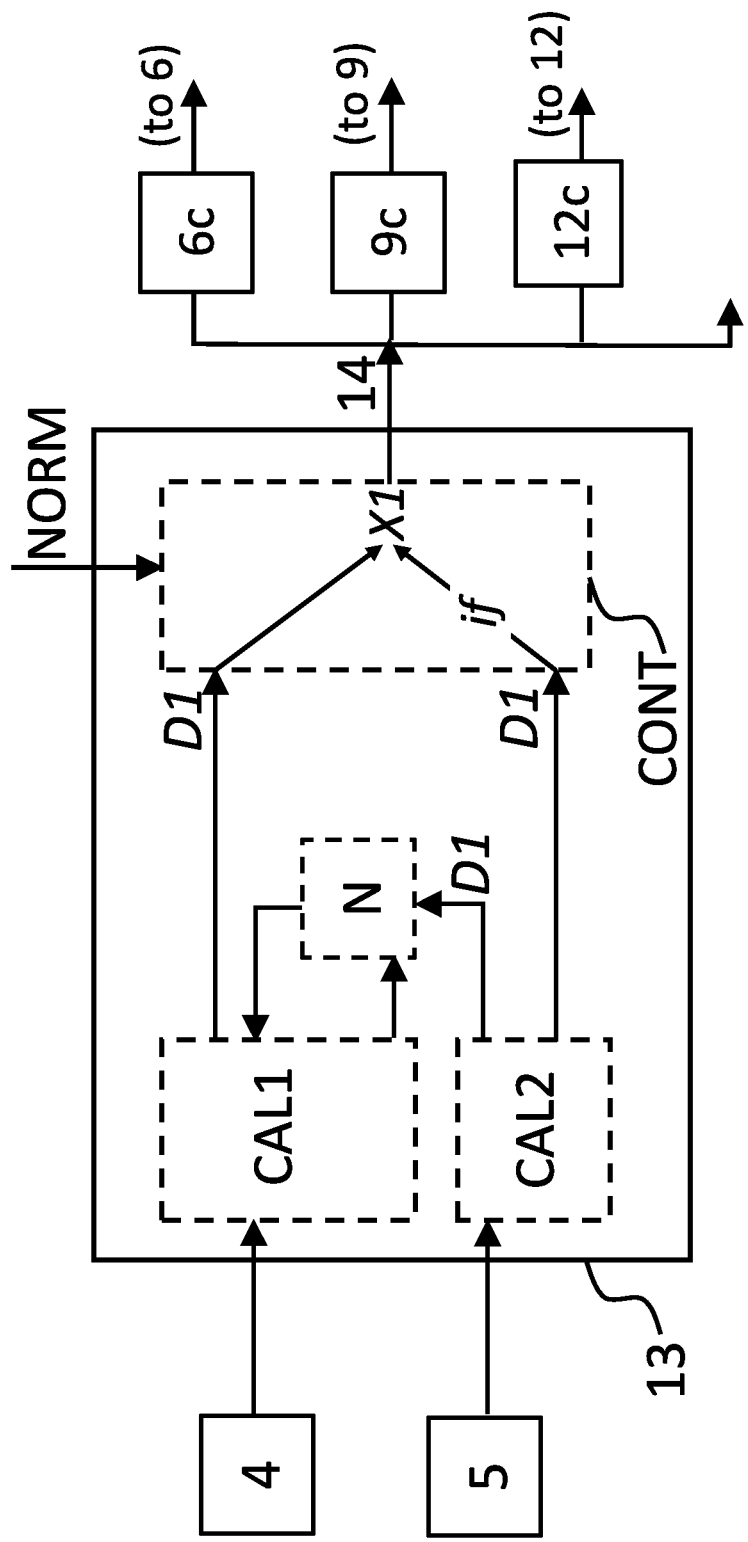
FIG. 3 shows the flowchart diagram of a method according to one illustrative embodiment of the disclosure.

FIG. 3 shows a flowchart according to one embodiment of the present disclosure. At the beginning of the thermal treatment process of the glass, the characteristics of the glass sheet to be tempered are identified. Into the computer 13 the thickness of the glass sheet is input, for example, by the operator or an automatic glass thickness gauge, and on the basis of the identified characteristics of the glass sheet tempering instructions are defined, i.e., the heating and cooling recipes. The heating recipe contains, for example, the transfer speed w, the heating time, the setting values of the temperatures of the furnace, and the control values for convection blowing during the heating time of the glass sheet. The cooling recipe does not relate to the furnace, but instead to the control of the cooling unit located downstream of the furnace. The input of information can be performed, for example, using a keyboard, with which the information is transferred into the computer 13 of the tempering device. In particular, the selection of the heating recipe of the heating furnace requires an experienced operator. In FIG. 3, the arrow NORM shows the heating recipe values selected into the control device by the operator. For the operator, it is particularly demanding and slow to take into consideration the special adjustments in the control of the furnace required by various glass loading patterns, glass sizes and shapes. Illustrative embodiments of the present disclosure can solve this disadvantage using a novel, fast, reliable and preferably also self-learning machine vision solution.

The machine vision solution of the disclosure is fast, because initial information regarding the dimensions of the glass load is obtained before the glass load transfers into the furnace. The solution of the disclosure is reliable, because the accuracy of the initial information, based on a photograph, is monitored by the later information produced by the line scanner. The solution of the disclosure is self-learning, because the information produced by the line scanner is used to teach the method identifying the dimensions of a glass load based on a photograph.

When a glass load transfers towards the furnace, it is preferably stopped before transferring into the furnace. A photograph is taken of the stopped glass load by a camera 4. The glass load can also be photographed while in motion without above-said stopping, provided that the quality of the photograph taken is adequate. The information of the photograph is sent to the computer 13. On the basis of the information, the computer 13 defines by a calculation code CAL1, which preferably includes a neural network N, at least one dimension D1 of the glass load, on the basis of which the computer 13 (for example, its control system code CONT) determines at least one adjustment parameter X1 of the heating furnace and sends the control message 14 of the adjustment parameter to the device 6c controlling the electric resistor 6 of the furnace, or to the frequency converter 9c controlling the motor 9 of the convection blower, or to the device 12c controlling the adjustment valve 12. After this, the glass load transfers into the heating furnace, during which transfer, in a preferred solution of the disclosure, the information required for defining the dimensions of the glass load is read by a line scanner 5. The information of the line scanner 5 is sent to the computer 13. On the basis of the information, the computer defines by a calculation code CAL2 the dimension D1 of the same glass load, and if its magnitude should differ substantially from the value defined already earlier by the calculation code CAL1 on the basis of the camera image, the computer 13 will predetermine the value X1 of the adjustment parameter and send its control message 14 to the device 6c controlling the electric resistor 6 of the furnace, or to the frequency converter 9c controlling the motor 9 of the convection blower, or to the device 12c controlling the adjustment valve 12.

The above text described the solution of the disclosure shown in FIG. 3. Calculation codes CAL1 and CAL2 can determine also other dimensions of the glass load (for example, D1 and D2) and control the heating furnace by various adjustment parameters (for example, X1 and X2). In this case, on the basis of the camera image is defined, for example, the loading pattern of the starting end of the load, and by the line scanner the entire loading pattern. In this case, the camera can be disposed in an optimal position to photograph only the front or rear part of the glass load that improves the accuracy of the camera image. Also in this case, the heating furnace is brought into an automatic adjustment depending on a loading pattern more quickly than by just a line scanner in front of the furnace.

According to the preferred embodiment of the disclosure described above, from the information of the photograph at least one dimension of the glass load is defined and from the information of the line scanner the same dimension is redefined. The dimensions describe the load of glass sheets and the information includes at least one of the following characteristics of the glass sheet or the glass load: shape, length, width, size, surface area, location, loading degree, the number of glass sheets, the load length and the load width. The loading degree is the total surface area of the glasses of the load in relation to a full loading area. According to a preferred embodiment, dimension D, defined on the basis of the information provided by both the photograph and the line scanner, is the loading pattern of the entire glass load that covers information regarding the locations, shapes and sizes of the glass sheets of the glass load. The loading pattern also tells the distances between the edge lines of the glass sheets of the glass load. The dimension accuracy sought for in the disclosure is, for example, such that the glass sheets typically at a minimum of 50 mm intervals in a glass load are seen as separate glass sheets in a loading pattern determined by the disclosure.

The adjustment parameters X are preferably the local adjustment temperature of the furnace (measured by the temperature sensor 7), or some other value affecting the momentary supply of electric current to the electric resistors, the rotational speed of the motor 9 of the convection blower, the adjustment pressure of the adjustment valve 12 and the position of above said shut-off valve. The convection level suitable for the glass heating is dependent, for example, on the sizes of the glass sheets of the glass load. When the sizes of the glasses, or at least the size of the largest glass sheet, are ascertained already when the glass load is on the loading table, the rotational speed of the convection blower, on which the level of convection is dependent, can be adjusted to a suitable value, to which it has time to adjust (this takes at least several seconds depending on the adjustment change) already before the glass load transfers into the furnace. Correspondingly, when the loading pattern is known already when the glass load is on the loading table, the separately adjustable local adjustment temperature of the heating field of the furnace, or some other value affecting the momentary supply of electric current to the electric resistors, can be brought into effect immediately in the beginning of the heating. If the furnace has a convection blowing device that follows the movement of the glass, as in patent publication U.S. Pat. No. 8,322,162B2, it can be used to direct convection onto the different glasses of the glass load as desired immediately from the beginning of the heating.

According to one embodiment of the disclosure described above and in FIG. 3, the dimension defined on the basis of the information of the photograph and the dimension defined on the basis of the line scanner located in front of the furnace are the same, and if their magnitudes should differ substantially, the adjustment parameter selected on the basis of the magnitude of the first dimension is reselected on the basis of the magnitude of the latter dimension. Thus, the information of the line scanner is used to monitor the accuracy and precision of the dimension determined from the photograph, and a correction of the adjustment parameter is executed, if the dimension defined on the basis of the photograph is substantially incorrect (in FIG. 3, the arrow with the word "if" from dimension D1 to adjustment parameter X1). In this case, the value of the corrected adjustment parameter is set into effect in the heating recipe when the computer has executed above said monitoring, i.e., almost immediately when the glass load has transferred over the measurement line of the line scanner towards the furnace. Preferably, the information of the line scanner is utilized, i.e., analysed by the computer, already once the front part of the glass load has been read as it transfers over the measurement line of the line scanner. It is thus not necessary to wait for the above said transferring of the entire glass load.

Neural networks are information processing, mathematics or calculation models that are based on connectionism. While in ordinary expert systems are used "if-then" rule pairs, the neural network is taught by means of examples. The aim is to have the neural network learn the non-linear dependency relationships between variables directly from the observational material.

According to the disclosure, in a device can, according to a preferred embodiment of the disclosure, be used a neural network N. The information obtained from the photograph by the camera 4 is modified in the computer into the shape required by the neural network that is sent in the computer 13 to the neural network which defines the dimensions D1 of the glass load (in FIG. 3, the arrow from calculation code CAL1 to neural network N and back). The information obtained from the line scanner 5 or the dimensions D1 determined from the information are sent in the computer to the neural network as observational material for it to be taught (in FIG. 3, the arrow from calculation code CAL2 to neural network N). The neural network is capable of learning on the basis of the information obtained from the line scanner and of interpreting photographs better and, thus, of better determining the shape and dimensions of a glass load on the basis of a photograph in the future. In one instance, a neural network was taught by a line scanner to determine the dimensions of a glass load, i.e., the sizes of the glasses and their distances, quite reliably with approximately 300 separate glass loads. Once the neural network has been taught, the purpose of the line scanner is thereafter mostly monitoring the random mistakes of the method for defining glass loading dimensions on the basis of a photograph. As a line scanner required for the above said neural network teaching practice may also be used a temperature scanner generally used in tempering lines for measuring the temperature of the glass load after the furnace, i.e., the starting temperature for quench cooling. This temperature scanner may also be used for monitoring the accuracy of the dimension determined from the photograph but, by this monitoring, there is no longer time to influence the heating recipe of the glass load.

The location of the front end of the glass load on the loading table is at the line scanner, or at some other given site, at which the glass load is set to stop to be photographed. Determined from the information of this photograph, just the location of the rear of the load is adequate for determining the length of the glass load which is useful information in the selecting of adjustment parameters, such as for example, heating time.

According to one preferred embodiment, a glass load approaching the heating furnace on the transfer conveyor is stopped on the transfer conveyor for photographing. The quality of the photograph improves if the glass load is stationary while the photograph is taken, wherein the dimensions of the glass load are more easily determined from the photograph.

The camera can photograph the glass load also at other wavelengths than those of light, for example, at UV or IR wavelengths. In the claims is indeed used, instead of photograph, the wording camera image which covers all camera technologies. The camera may also be called an imaging device. The use of a camera taking photographs is a preferred solution. In the disclosure, the camera is a 2D camera, i.e., an imaging device taking two-dimensional images.

In the disclosure, as neural networks can be considered all mathematical methods of information processing that can be taught by means of examples, for example, about the non-linear dependency relationships between variables.

The present disclosure is not limited only to the presented illustrative embodiment but several modifications are possible within the scope of the claims.

The invention claimed is:

1. A method for controlling a glass sheet heating furnace using information describing a glass load including a plurality of glass sheets, the method comprising:
before thermal treatment, before a front edge of the glass load is inside the heating furnace, photographing the glass load by at least one two-dimensional camera to obtain a two-dimensional camera image, wherein the photographing of the glass load by the at least one two-dimensional camera to obtain the two-dimensional camera image is performed when the glass load is stationary;
sending a first information of the two-dimensional camera image to a computer;
in response to sending the first information of the two-dimensional camera image to the computer, receiving, from the computer, a value for one adjustment parameter of the heating furnace before the glass load has been transferred into the heating furnace;
adjusting a setting of the heating furnace based on the value for the one adjustment parameter; and
transferring the glass load into the heating furnace.

2. A method according to claim 1, further comprising:
determining, by the computer, and based on the first information, a first value of at least one dimension of the glass load;
selecting the one adjustment parameter based on the first value;
reading a second information by a line scanner, and sending the second information to the computer;
determining, by the computer, and based on the second information, a second value of the at least one dimension of the glass load;
when the first value and the second value differ, reselecting the one adjustment parameter as a new value based on the second value; and
adjusting the setting of the heating furnace based on the new value.

3. A method according to claim 2, wherein the second information is read, by the line scanner, on a loading table of the glass load during transfer of the glass load into the heating furnace.

4. A method according to claim 2, wherein the first value is determined from the first information of the two-dimensional camera image in the computer using a neural network.

5. A method according to claim 4, wherein the second information of the line scanner or the second value is sent to the neural network as observational material for training the neural network.

6. A method according to claim 1, wherein the at least one dimension includes a loading pattern of the glass load.

7. A method according to claim 1, wherein the at least one dimension includes a distance to a rear end of the glass load from a front end of the glass load, a loading degree, or a size of a largest glass sheet of the glass load.

8. A method according to claim 1, wherein the glass load, when approaching the heating furnace, is stopped on a transfer conveyor to be photographed by the camera.

9. A method according to claim 1, wherein the value of the adjustment parameter is a rotational speed of a blower or a position of an adjustment valve.

10. A method according to claim 1, wherein the value of the adjustment parameter selected based on the two-dimensional camera image is included in a heating recipe for the glass load before the glass load to be transferred into the heating furnace is read by the line scanner.

11. A method according to claim 1, wherein the two-dimensional camera image is an image of an entirety of the glass load.

12. A method according to claim 1, wherein the photographing is performed when an entirety of the glass load is on a loading table upstream of the heating furnace.

13. A method according to claim 1, wherein the value of the adjustment parameter is a rotational speed of a motor of a convection blower of the heating furnace, or an adjustment pressure or an open/closed position of a valve feeding convection nozzle, or a local adjustment temperature of the heating furnace.

14. A method according to claim 1, wherein the receiving and the adjusting are performed by a device controlling an electric resistor of the heating furnace, or a frequency converter controlling a motor of a convection blower, or a device controlling an adjustment valve of a convection system.

15. A method according to claim 14, wherein the adjusting includes controlling the electric resistor of the heating furnace, or controlling the motor of the convection blower, or controlling the adjustment valve of the convection system.

* * * * *